March 22, 1955  G. W. BAIN, JR., ET AL  2,704,821
GAS TUBE VOLTAGE REGULATORS
Filed Jan. 3, 1951
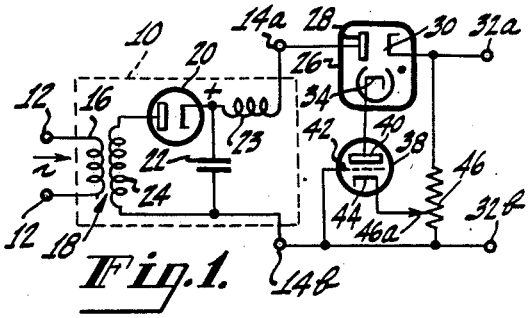
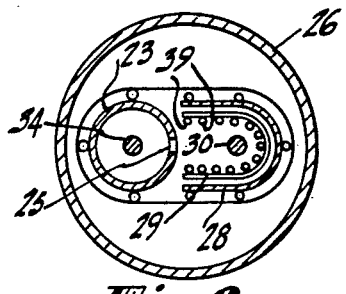
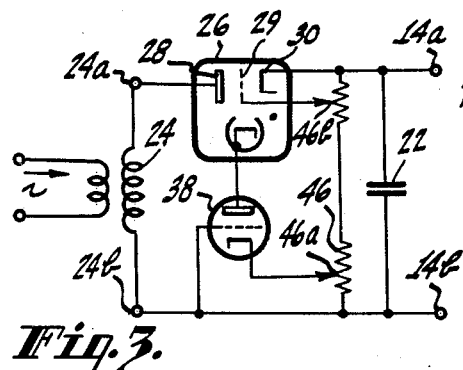
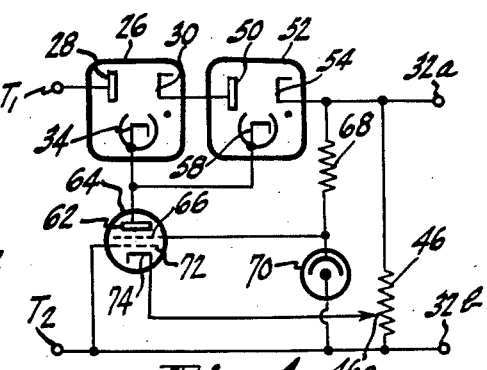
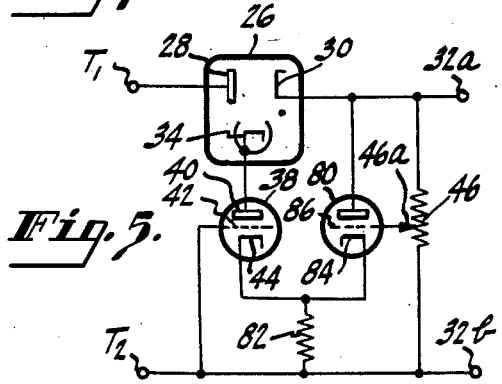
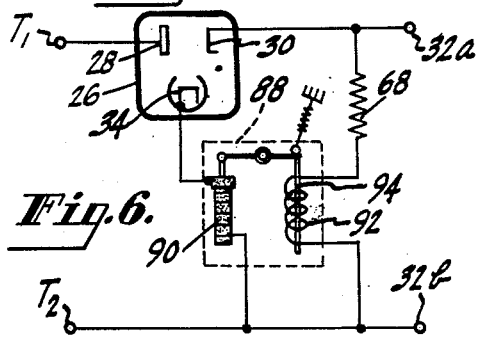
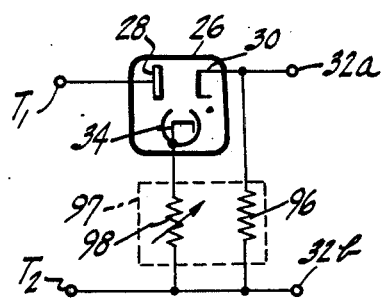
EDWARD D. JOHNSON &
GEORGE W. BAIN, JR.
INVENTORS
BY Morris B. Rabkin
ATTORNEY

United States Patent Office 2,704,821
Patented Mar. 22, 1955

2,704,821

GAS TUBE VOLTAGE REGULATORS

George William Bain, Jr., New Brunswick, and Edward Oscar Johnson, Princeton, N. J., assignors to Radio Corporation of America, a corporation of Delaware Application January 3, 1951, Serial No. 204,105

6 Claims. (Cl. 321—18)

This invention relates to improvements in electrical power supply systems, and particularly to power supply systems utilizing gas filled electron tubes.

In electrical apparatus requiring unidirectional operating voltage, it is customary to provide a so-called power supply system for converting alternating voltage to unidirectional voltage.

Frequently, the operating characteristics of a given electrical apparatus require that the unidirectional operating voltage supplied thereto be kept relatively constant, or "regulated," notwithstanding changes in the source voltage or in the load on the power supply. Regulated power supplies frequently include a grid-controlled vacuum tube connected between the power supply rectifier and the load, with the impedance of the tube being varied in accordance with the voltage furnished to the load.

Regulated power supplies of this type have definite disadvantages. Since vacuum tubes inherently are relatively high impedance devices, they cannot pass large amounts of current to the load without substantial voltage losses. Even for a load requiring only, say, 100 milliamperes of current, it is not unusual to find as many as four large triode tubes connected in parallel in a regulating system.

Furthermore, a grid-controlled vacuum tube has characteristics that make it unsuitable for use as a rectifier. Therefore, conventional regulated power supply systems ordinarily have separate rectifier and regulating tubes.

All of the above-mentioned deficiencies of prior art regulated power supply systems add to the complexity, cost, size and weight thereof.

It is a general object of the present invention to provide a power supply system having relatively high current handling capability, good regulating characteristics, and unusual operating efficiency.

A further object of the invention is to provide a system for supplying regulated unidirectional voltage to a load from a variable voltage source with a minimum of voltage loss.

Another object of the invention is to provide a power supply system wherein alternating voltage rectification and unidirectional voltage regulation are effected simultaneously in a single electron tube.

In accordance with the invention, the foregoing and other related objects and advantages are obtained in a regulated power supply utilizing a gaseous electron tube either as a variable impedance element or as a combined variable impedance element and rectifier. The gaseous electron tube utilized in accordance with the invention is of the type wherein separate potentials are used to provide the ionization needed for space charge neutralization and to provide the field needed for drawing current through the ionized gas. As will be pointed out more fully hereinafter, a system of this type can handle unusually large amounts of current and with very low voltage loss.

A more complete understanding of the invention can be had by reference to the following description of illustrative embodiments thereof, when considered in connection with the accompanying drawing, wherein:

Fig. 1 is a schematic diagram of a power supply system having a regulator embodying the present invention.

Fig. 2 is a sectional view of a gas filled electron tube such as may be used in the circuit of Fig. 1, Fig. 3 illustrates a combined rectifier and regulator arranged in accordance with the invention, and Figs. 4-7 show modified arrangements of regulators embodying the principles of the invention.

Referring to the drawing, there is shown in Fig. 1 a power supply system having a regulator arranged in accordance with the principles of the present invention. The power supply of Fig. 1 includes a rectifying network 10 for converting alternating voltage applied to the input terminals 12 thereof into unidirectional voltage at a second pair of terminals 14a, 14b. The primary winding 16 of a transformer 18 is connected to the terminals 12, and a rectifier tube 20 is connected in series with a filter capacitor 22 across the secondary winding 24 of the transformer 18.

The rectifying network 10 is conventional in form. When alternating voltage is applied to the terminals 12, the rectifier 20 will conduct current on alternate half cycles, developing a unidirectional voltage, or polarity as indicated, across the capacitor 22. If desired, a filter choke 23 can be connected between the rectifier tube 20 and the positive output terminal 14a of the rectifying network.

If a load device were to be connected across the terminals 14a, 14b, it is possible that the voltage at these terminals might vary, due either to a change in the input voltage or to a change in the load. In order to compensate for such changes, a gaseous electron tube 26 has its anode 28 connected to one of the terminals 14, and its cathode 30 connected to an output terminal 32a. Thus, the space path between the electrodes 28, 30 of the tube 26 is in series between the terminals 14a and 32a.

The gas tube 26 of Fig. 1 also is provided with an auxiliary cathode 34 from which current can flow either to the main cathode 30, or to the anode 28, or to both. This current from the auxiliary cathode 34 is relied on to ionize the gas in the tube 26, and will be referred to hereinafter as the ionizing current.

The ionizing current circuit is completed by connecting the auxiliary cathode 34 to the negative terminal 14b through a current control element, shown in Fig. 1 as a triode amplifier tube 38. The amplifier tube anode 40 is connected to the auxiliary cathode 34, while the control grid 42 thereof is connected to the negative terminal 14b of the rectifying network 10. The amplifier tube cathode 44 is connected to the tap 46a of a potentiometer 46 which is connected between the output terminals 32a, 32b.

The structural details of a typical tube such as the tube 26 are given hereinafter. A tube of this general type is described more fully and claimed in the copending application of E. O. Johnson, Serial No. 185,745, filed September 20, 1950, and assigned to the assignee of the present invention.

In the circuit of Fig. 1, the voltage supplied to the output terminal 32a from the positive terminal 14a of the rectifying network 10 can be regulated by varying the impedance (and, hence, the voltage drop) between the anode 28 and the main cathode 30 in the tube 26. In accordance with an important feature of the present invention, this voltage drop is regulated by varying the current which ionizes the gas in the tube 26.

As is explained in the above-mentioned copending application, if the function of ionizing the gas in a gaseous electron tube is separated from the function of passing work circuit current between the main tube electrodes, it is possible to control the work circuit current by means of the ionizing current.

Consider, for example, the tube shown in cross section in Fig. 2. In Fig. 2, a gas tight envelope 26 is provided with a cathode 30. A U-shaped control electrode or grid 29 and a U-shaped anode 28 partially surround the cathode 30. The grid 29 comprises a plurality of parallel wires 39 which are supported in spaced relation. The anode 28 may be a sheet metal element.

Opposite the open ends of the grid 29 and the anode 28 there is mounted a cylindrical focusing electrode 23 provided with an elongated slot 25 facing the open ends of the grid and anode structures. An auxiliary cathode 34 is mounted coaxially within the focusing electrode 23.

A tube having a structure such as that shown in Fig. 2 can be operated as follows:

If a voltage greater than the ionizing voltage of the gas in the tube 26 is applied between the auxiliary cathode 34 and the anode 28, a current will flow which will ionize the gas in the tube. As a result, a highly conductive mixture or "plasma" of ions and electrons will be created within the tube envelope. The focusing electrode 23 is effective to concentrate the ionizing current, making it possible to obtain high plasma densities with very small amounts of current or power. With the tube gas ionized to create plasma in the manner just described, it becomes possible to pass relatively high current between the main cathode and the main anode with a voltage drop which may be of the order 0.1 volt or less. Furthermore, it also becomes possible to control this main cathode-anode current by means of a control electrode 29 disposed in the space path as shown, or by controlling the ionizing current.

The system shown in Fig. 1 will operate in the following manner:

Assume that the voltage between the terminals 14a, 14b tends to increase. This, in turn, will cause an increase in the voltage across the potentiometer 46, and, hence, an increase in the voltage between the potentiometer tap 46a and the negative terminal 14b of the rectifying network 10. This will make the amplifier tube control electrode 42 more negative with respect to the cathode 44 thereof. As a result, there will be a decrease in the current flowing in the auxiliary discharge circuit for the gas tube, accompanied by an increase in the voltage drop between the main gas tube electrodes 28, 30. This increase in voltage drop will oppose the original voltage change at the terminals 14a, 14b, and will tend to maintain the voltage between the output terminals 32a, 32b essentially constant.

In Fig. 3, there is shown a circuit in which the functions of regulating and rectifying are combined. The circuit of Fig. 3 also illustrates a dual regulating arrangement.

In the system shown in Fig. 3, the rectifying network 10 of Fig. 1 has been eliminated. The gas tube anode 28 is connected directly to one terminal 24a of the transformer secondary winding 24, while the main cathode 30 is connected to the other secondary winding terminal 24b through the capacitor 22. Thus, the work circuit of the gas tube 26 will supply rectified current to charge the capacitor 22.

In the circuit of Fig. 3, two regulatory networks are provided. First, an ionizing current control tube 38 is connected in circuit with the auxiliary cathode 34, as in the network of Fig. 1. Second, the gas tube 26 is provided with a control electrode 29 between the anode 28 and the main cathode 30. This control electrode 29 is connected to a second tap 46b on the potentiometer 46.

The regulatory action of the tube 26 in the circuit of Fig. 3 will be as follows:

First, the amplifier 38 will control the auxiliary discharge current to provide regulation in the manner already described in connection with the circuit of Fig. 1.

Second, changes in the voltage across the potentiometer 46 will appear as changes in the voltage at the main gas tube cathode 30 and as smaller changes at the gas tube control electrode 29. Since the change will be less at the control electrode 29 in any given case than at the cathode 30, effectively the gas tube grid-to-cathode voltage changes will be directly proportional but opposite in sign to the voltage changes across the potentiometer 46. In turn, this will cause the impedance between anode and main cathode of the gas tube to change in the correct direction to tend to compensate for load voltage changes.

Assume that the voltage between the terminals 14a, 14b tends to increase. This, in turn, will cause an increase in the voltage across the potentiometer 46, as measured at the main cathode 30 of the gas tube 26. The voltage also will increase at the control electrode 29. However, since the voltage at the main cathode 30 will increase more than the control electrode voltage, the net effect will be to make the control electrode 29 more negative with respect to the cathode 30. As a result, there will be an increase in the effective impedance between the main cathode 30 and the anode 28, accompanied by an increase in the voltage drop between these electrodes 28, 30. This increase in voltage drop will tend to oppose the original voltage change at the terminals 14a, 14b, and will tend to maintain the voltage between the output terminals 14a, 14b essentially constant.

The circuits thus far described will provide regulatory compensation for voltage changes of several volts, and with a voltage loss in the regulator tube of no more than, say, 0.1 volt for the minimum value of source voltage. At the same time, currents of as much as one ampere can be handled readily in systems of the type shown in Figs. 1 and 3.

One factor to be considered in the design of a system of the type shown herein is that the voltage between the gas tube anode 28 and the main cathode 30 should not exceed the ionizing potential of the tube gas. If this ionizing potential is exceeded, an ionizing discharge may occur between the main cathode and the anode, and both grid control and ionizing current control of the work circuit current will be lost. If it is anticipated that the voltage may change by an amount greater than the ionizing potential of the tube gas, two or more gas tubes can be connected in series between the voltage source and the load to insure that the voltage between the main tube electrodes of any one of the tubes will not exceed the ionizing potential of the gas.

A regulator embodying two serially connected gas tubes is shown in Fig. 4. In the circuit of Fig. 4, the anode 28 of a first gaseous electron tube 26 is connected to an input terminal T1, corresponding either to the terminal 14a of Fig. 1 or to the terminal 24a of Fig. 3. The main cathode 30 of this first tube 26 is connected to the anode 50 of a second gas discharge tube 52. The cathode 54 of the second tube 52 is connected to the output terminal 32a. The auxiliary cathodes 34, 58 of the gas tubes 26, 52 are connected to the anode 62 of an amplifier tube 64.

In this case, a tetrode-type tube has been shown as the ionizing current control element. A tetrode tube has certain characteristics that make it particularly suitable as an ionizing current control element for reasons given hereinafter.

A resistor 68 and a conventional gas regulator tube 70 are connected in series between the output terminals 32a, 32b. The screen grid 66 of the tetrode tube 64 is connected to the substantially constant voltage junction point between the resistor 68 and the regulator 70. The tetrode control grid 72 is connected to the output terminal 32b, and the cathode 74 is connected to the tap 46a of a potentiometer 46.

The operation of the circuit of Fig. 4 will be quite similar to that of the circuit of Fig. 1, the principal difference being that the voltage drop between the input terminal T1 and the output terminal 32a will be substantially equally divided between the anode-main cathode space paths of the two tubes 26, 52. This will allow for a greater range of regulation without adversely affecting the operation of the gas tubes.

It is known that a screen grid vacuum tube (tetrode, pentode etc.) has the characteristic of drawing substantially constant current for a given control grid voltage, even if the anode voltage varies considerably, provided the screen grid voltage is held substantially constant. Stated somewhat differently, by holding the screen grid voltage constant, the tube current can be made to depend almost solely on the control grid voltage even though the anode voltage changes. This is advantageous in any of the circuits of Figs. 1, 3 or 4, since in each of these circuits the anode-cathode voltage of the amplifier tube (38 or 64) is subject to some change as the cathode voltage changes. The circuit of Fig. 4 shows a typical arrangement for utilizing a screen grid tube with constant screen grid voltage.

In Fig. 5 there is shown a further embodiment of the present invention wherein the ionizing current does not flow through the potentiometer from which the output voltage sample is obtained. In Fig. 5, a pair of amplifier tubes 38, 80 are connected in a cathode coupled phase inverting and amplifying network. One tube, 38, is connected in series in the gas tube ionizing circuit, while the other tube, 80, is connected between the output terminals, 32a, 32b in series with a resistor 82. The cathodes 44, 84 of the tubes 38, 80 are connected in common to the resistor 82 to provide cathode coupling therebetween. The control grid 42 of the tube 38 in the ionizing circuit is connected to the input terminal T2, while the other tube control grid 86 is connected to the tap 46a of a potentiometer 46 connected between the output terminals 32a, 32b.

By virtue of the cathode coupling between the tubes 38, 80, any change in voltage at the potentiometer tap 46a will cause an opposite change in the ionizing current. Thus, if the voltage increases at the tap 46a, the tube 80 will draw more current, causing the cathode voltage thereof and of the other tube 38 to rise. This will have the effect of making the grid-cathode voltage of the ionizing current control tube 38 more negative, thereby decreasing the ionizing current. In turn, the effective impedance between the anode 28 and main cathode 30 will increase, thereby tending to offset the original output voltage change.

It will be apparent that the present invention is not limited to the use of a vacuum tube amplifier as an ionizing current control element. The circuit of Fig. 6 illustrates the use of a solenoid-controlled carbon pile regulator 88 as the auxiliary discharge current control element.

In the circuit of Fig. 6, the carbon pile resistance element 90 of the regulator 88 is connected in series with the auxiliary cathode 34 of the gas tube 26. The solenoid control winding 92 is connected in series with a resistor 68 between the terminals 32a, 32b.

In the circuit of Fig. 6, an increase in the voltage between the terminals 32a, 32b will increase the current through the winding 92, causing the core 94 to move downwardly. This will decrease the pressure on the carbon pile element 90, increasing the resistance thereof. The resultant decrease in the ionizing current will tend to provide the desired output voltage regulation, as in the preceding examples.

A further alternative type of control element is shown in the embodiment of the invention illustrated in Fig. 7. In Fig. 7, a heating element 96 in a heat unit 97, such as an electric oven or the like, is connected between the output terminals 32a, 32b, and a so-called thermistor 98 (i. e. a resistor whose value varies with temperature) is connected in the auxiliary discharge circuit of the gas tube 26. The thermistor element should have a positive temperature coefficient so that the impedance thereof will decrease when the temperature in the heat unit 97 decreases and will increase when the temperature increases.

With this arrangement, any increase in the voltage between the output terminals 32a, 32b will cause a corresponding increase in the temperature of the heat unit 97. In turn, the thermistor 98 will increase in impedance, reducing the ionizing current to increase the main gas tube impedance.

It can be seen that the present invention provides an efficient and versatile gas tube voltage regulating system.

What is claimed is:

1. Apparatus for regulating the voltage supplied to a load impedance from a voltage source by a variable impedance gaseous electron tube having electrodes including an anode, a main cathode, and an auxiliary cathode, said apparatus comprising a circuit connecting said voltage source to said load impedance and including said anode and said main cathode and the space path therebetween, a circuit in shunt with said voltage source and including said anode and said auxiliary cathode and the space path therebetween, and a voltage responsive current control element in said last named circuit coupled to said load impedance to vary the current between said auxiliary cathode and the others of said electrodes as an inverse function of the voltage across said load impedance.

2. Apparatus as defined in claim 1 wherein said current control element comprises an amplifier tube having a control electrode, an anode, and a cathode, said control electrode and said cathode being connected to said load impedance, said last-mentioned anode being connected directly to said auxiliary cathode.

3. Apparatus as defined in claim 1 wherein said current control element comprises an amplifier tube having a control grid and a cathode, a second amplifier tube having a control grid and a cathode, a resistor common to the cathode circuits of said amplifier tubes, and connections between said load impedance and said control grids.

4. In a system for converting alternating voltage to regulated unidirectional voltage, in combination, an alternating voltage source, a gas tube having an anode, a main cathode and an auxiliary cathode, an impedance, a circuit connecting said impedance to said voltage source through the space path between said anode and said main cathode, a second circuit connecting said voltage source across the space path between said anode and said auxiliary cathode, an amplifier tube having an anode, a cathode and a control grid, said amplifier tube being connected in said second circuit, and connections between said load impedance and said amplifier cathode and control grid.

5. In a system for supplying regulated unidirectional voltage wherein a gaseous electron tube having a plurality of electrodes including an anode, a main cathode, and an auxiliary cathode is used as a variable impedance, a pair of input terminals, a pair of output terminals, a circuit connecting one of said input terminals to one of said output terminals through the space path between said anode and said main cathode, a connection between the other of said input and output terminals, a current control element, a circuit including said element connecting said anode and said auxiliary cathode between said input terminals, said current control element comprising an amplifier tube having a screen grid and a control grid, means connecting said screen grid and said control grid to maintain substantially constant voltage therebetween, and a circuit connecting said amplifier tube to said output terminals to control the current through said amplifier tube as an inverse function of the voltage between said output terminals.

6. A regulated power supply system comprising a gas filled tube having an anode, a main cathode and an auxiliary cathode, a capacitor, a transformer winding connecting said anode to said main cathode through said capacitor, a voltage responsive current control element connecting said anode to said auxiliary cathode through said transformer winding, and means coupling said capacitor to said element to control the current through said element as an inverse function of the voltage across said capacitor.

References Cited in the file of this patent

UNITED STATES PATENTS

| | | |
|---|---|---|
| 2,427,109 | Poch | Sept. 9, 1947 |
| 2,474,269 | Martinez | June 28, 1949 |